United States Patent
Ni et al.

(10) Patent No.: US 7,052,287 B1
(45) Date of Patent: May 30, 2006

(54) USB DEVICE WITH PLASTIC HOUSING HAVING INTEGRATED PLUG SHELL

(75) Inventors: Jim Ni, San Jose, CA (US); Ren-Kang Chiou, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 11/131,066

(22) Filed: May 16, 2005

(51) Int. Cl.
*H01R 12/00* (2006.01)

(52) U.S. Cl. ............... 439/76.1; 439/660; 439/906
(58) Field of Classification Search ........... 439/76.1, 439/660, 906; 361/752
See application file for complete search history.

(56) References Cited

U.S. PATENT DOCUMENTS

| | | | |
|---|---|---|---|
| 5,941,733 A * | 8/1999 | Lai | ............... 439/610 |
| 6,309,255 B1 | 10/2001 | Yu | |
| 6,618,243 B1 | 9/2003 | Tirosh | |
| 6,671,808 B1 | 12/2003 | Abbott et al. | |
| 6,744,634 B1 | 6/2004 | Yen | |
| 6,854,984 B1 | 2/2005 | Lee et al. | |
| 6,948,983 B1 * | 9/2005 | Peng | ............... 439/660 |
| 2003/0100203 A1 | 5/2003 | Yen | |

* cited by examiner

*Primary Examiner*—Truc Nguyen
(74) *Attorney, Agent, or Firm*—Bever, Hoffman & Harms, LLP; Patrick T. Bever (57) ABSTRACT

A Universal-Serial-Bus (USB) device includes a PCBA mounted inside a plastic housing molded from a hard plastic (e.g., PVC), and includes a handle portion mounted or molded over a body section of the PCBA, and a plug portion mounted or molded over a plug section of the PCBA. The plug portion of the housing is integrally connected to (i.e., molded at the same time as) the handle portion, and includes a plug substrate extending under the plug section of the PCBA and a plug shell that extends over the plug portion, forming a structural arrangement similar to a conventional male USB connector plug that allows access to metal contacts formed on the PCBA, but without having the plug shell soldered to the PCBA.

16 Claims, 10 Drawing Sheets

PRIOR ART

FIG. 16(A)

PRIOR ART

PRIOR ART

PRIOR ART

FIG. 17(B)

PRIOR ART

FIG. 18

PRIOR ART

FIG. 19(A)

PRIOR ART

FIG. 19(B)

USB DEVICE WITH PLASTIC HOUSING HAVING INTEGRATED PLUG SHELL

FIELD OF THE INVENTION

This invention relates to portable electronic devices, and more particularly to portable electronic devices that utilize the Universal-Serial-Bus (USB) specification.

BACKGROUND OF THE INVENTION

Rapid advances in technology in several areas have converged to enable small, portable memory cards with vast capacities. Flash memory technologies such as those using electrically-erasable programmable read-only memory (EEPROM) have produced chips storing 128 M-Bytes or more. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USB connector on a host system, such as a personal computer (PC). These USB-flash memory cards can be used in place of floppy disks. A USB-flash card can have a capacity of more than ten floppy disks in an area not much larger than a large postage stamp.

Figure 16A:
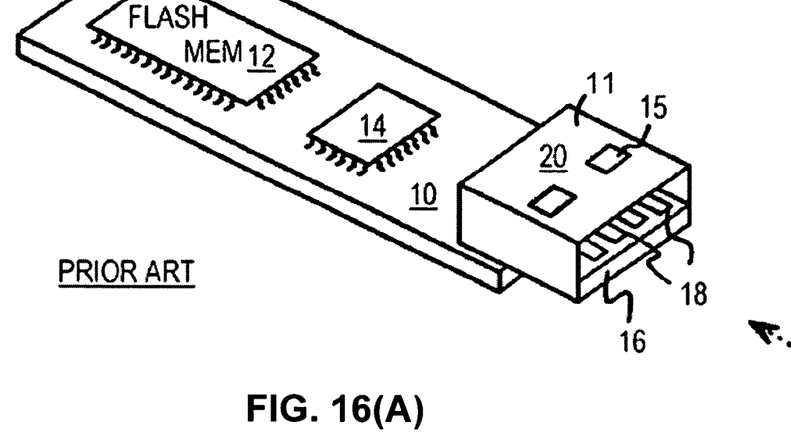
FIG. 16(A) shows a prior-art flash-memory card with a USB connector.

FIG. 16(A) shows a prior-art flash-memory card with a conventional male USB connector. Flash memory chip 12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

Male USB connector 20 may be mounted on board 10, which is a small circuit board with chips 12, 14 mounted thereon. Multi-layer printed-circuit board (PCB) technology can be used for board 10. A plastic case (not shown) can surround board 10.

Male USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D−.

Male USB connector 20 contains a metal case (plug shell) 11 that wraps around connector substrate 16. The plug shell touches connector substrate 16 on three of the sides of connector substrate 16. The top side of connector substrate 16, holding metal contacts 18, has a large gap to the top of the plug shell. On the top and bottom of this metal wrap are formed holes 15. USB connector 20 is a type-A USB connector.

Figure 16B:
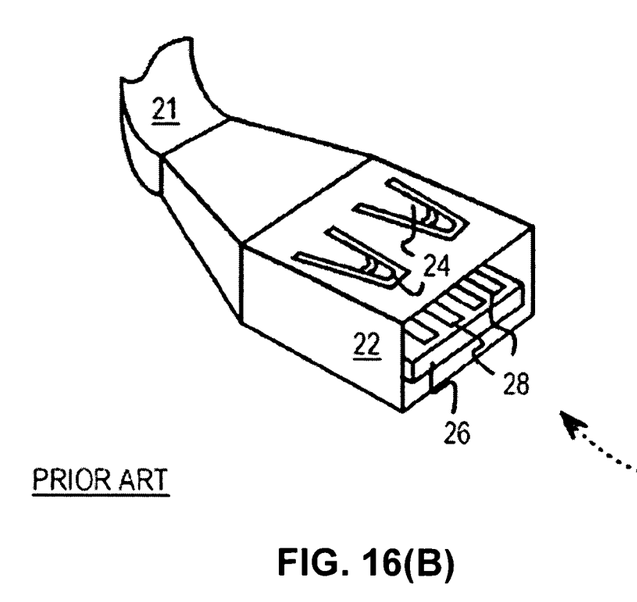
FIG. 16(B) shows a female USB connector.

FIG. 16(B) shows a female USB socket connector 22. Female USB socket connector 22 can be an integral part of a PC or other host system, or can be connected by cable 21 to such a host system. Another connector substrate 26 contains four metal contacts 28 that make electrical contact with the four metal contacts 18 of the male USB connector 20 of FIG. 16(A). Connector substrate 26 is wrapped by a metal case, but small gaps are between the metal case and connector substrate 26 on the lower three sides.

Locking is provided by metal springs 24 in the top and bottom of the metal plug shell. When male USB connector 20 of FIG. 16(A) is flipped over and inserted into Female USB socket connector 22 of FIG. 16(B), metal springs 24 lock into holes 15 of male USB connector 20.

Figure 17A:
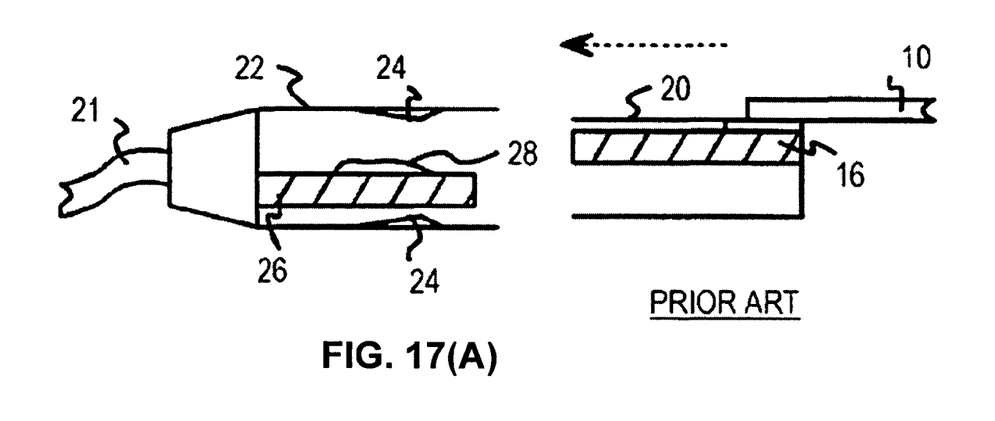
FIGS. 17(A) and 17(B) are cross-sections highlighting connections between male and female USB connectors.
Figure 17B:
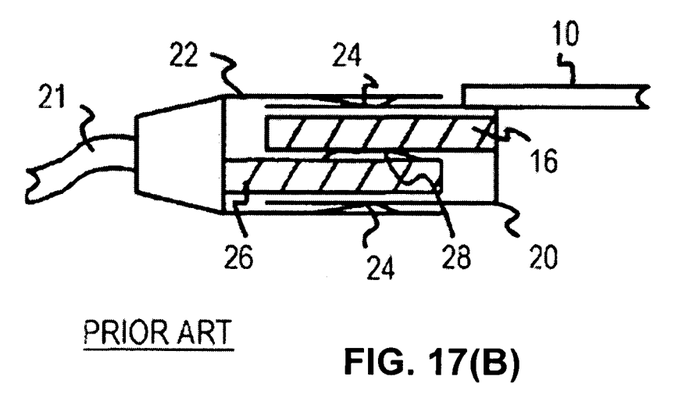

FIGS. 17(A) and 17(B) are cross-sections highlighting connections between male and female USB connectors. Female USB socket connector 22 is on the left while male USB connector 20 is being inserted from the right. Male USB connector 20 is flipped over relative to the view of FIG. 16(A). Metal contacts 18 are formed on the lower surface of connector substrate 16 on male USB connector 20, while metal contacts 28 are formed on the upper surface of connector substrate 26 on female USB socket connector 22. Thus the metal contacts face one another to allow for electrical contact when male USB connector 20 is inserted into female USB socket connector 22 as shown in FIG. 17(B).

Metal springs 24 formed on the metal case surrounding connector substrate 26 on Female USB socket connector 22 fit into holes on the plug shell of male USB connector 20. This helps to lock the connectors together.

A problem associated with the production of conventional male USB devices that utilize standard male USB plug connectors typically require lead-based soldering methods to attach the standard plug structure (e.g., substrate 16 and plug shell 11) to circuit board 10. Lead (Pb) is recognized as a hazardous material, and may at some point in time be banned from use. Lead-free soldering requires higher peak temperatures (about 240° C.) that can shrink or warp plastic substrates, thereby making such conventional USB plug connector structures unsuitable for lead-free fabrication processes.

Figure 18:
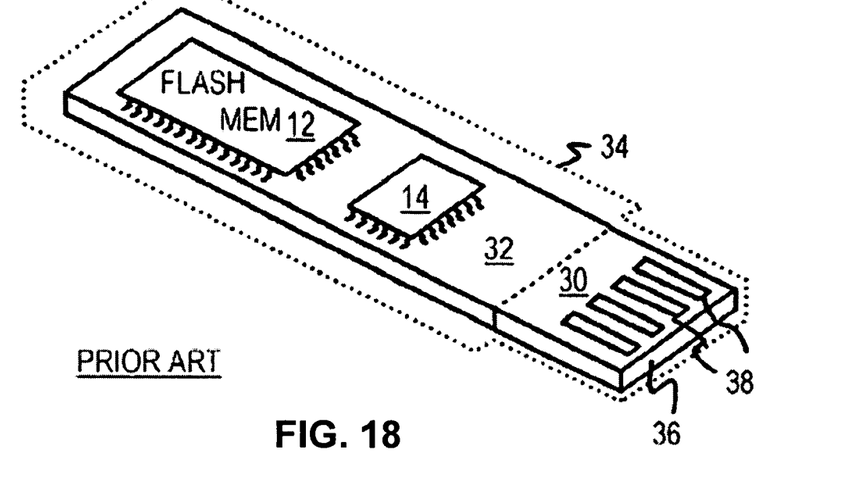
FIG. 18 shows a prior-art USB flash memory card using a USB connector.

FIG. 18 shows a prior-art USB flash memory card using a low-profile USB connector that avoids the need for attaching a separate substrate and plug shell to a circuit board by integrating male USB connector 30 with board 32, and by omitting the plug shell entirely. Board 32 is a PCB that has flash memory chip 12 and controller chip 14 mounted thereon. Board 32 is extended to include male USB connector 30, which has metal contacts 38 formed on end 36 of board 32. The width and thickness of board 32 at end 36 containing male USB connector 30 is designed to approximately match that of connector substrate 16 of FIG. 16(A). Plastic case 34 can enclose board 32 but have an opening for metal contacts 38. Plastic case 34 can cover the bottom and sides of male USB connector 30 up to end 36 to emulate potions of the metal case of the male USB connector of FIG. 16(A).

Figure 19A:
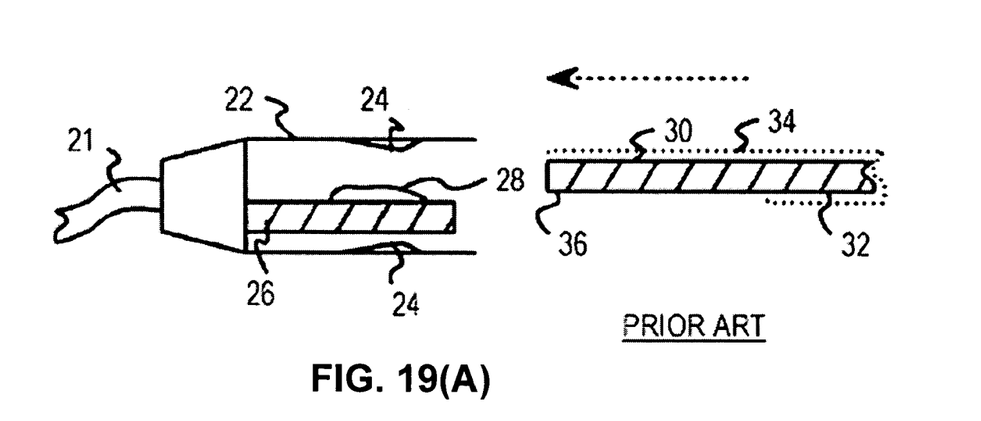
FIGS. 19(A) and 19(B) show cross-sections of the prior-art USB connector of FIG. 18 being inserted into a standard female USB connector socket.
Figure 19B:
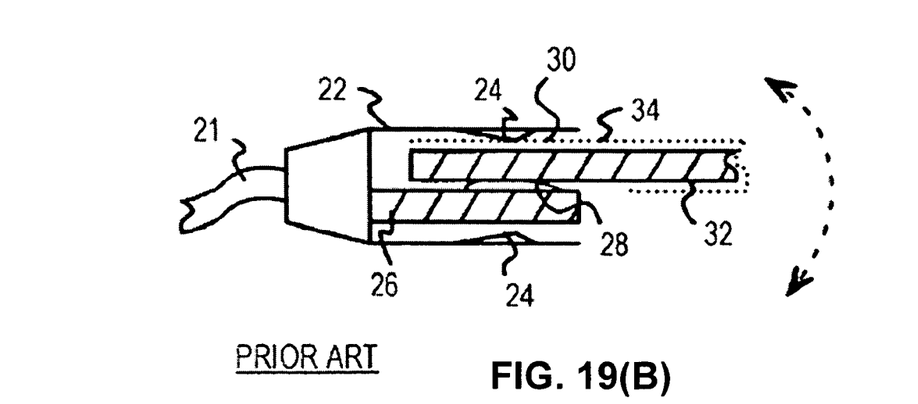

FIGS. 19(A) and 19(B) show cross-sections of the prior-art lower-profile USB connector being inserted into a standard Female USB connector. Board 32 that has male USB connector 30 formed on end 36 is flipped over from the view shown in FIG. 18, and end 36 is inserted into female USB socket connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of Female USB socket connector 22 when inserted as shown in FIG. 19(B).

Plastic case 34 helps to fill the gate between board 32 and the top edge of the metal case of Female USB socket connector 22. However, no holes are provided in plastic case 34, so metal springs 24 are pushed up slightly when male USB connector 30 is inserted into Female USB socket connector 22. Plastic case 34 is also formed along the thin edges of board 32 and helps to fill in the gaps between connector substrate 26 and the sides of the metal case of Female USB socket connector 22 that are above and below the plane of FIG. 19(B).

While USB connector 30 can be less expensive and smaller than the standard USB connector and avoids the need for plug shell, it can have the undesirable characteristic of wobbling in the female USB connector socket, and exposes contacts 38 to damage.

What is needed is a USB device having a male USB connector plug that avoids the need for soldering the plug shell to the circuit board. What is also needed is a method for manufacturing such USB devices.

SUMMARY OF THE INVENTION

The present invention is directed to a USB device in which the plug shell is integrally connected to and formed by a plastic housing that is formed or mounted over a printed circuit board assembly (PCBA), thereby avoiding the need for soldering the plug shell to the PCBA as in conventional manufacturing methods. The PCBA includes a printed circuit board (PCB) a PCB body (rear) section and a PCB plug (front) section, metal contacts disposed on the PCB plug section, and USB-compatible integrated circuits (ICs) mounted on the PCB body section. The plastic housing includes a handle portion mounted over the PCB body section, and a plug portion integrally connected to and extending from the handle portion. The PCB plug section is fixedly attached to a lower wall of the plug portion such that the lower wall covers and supports the lower surface of the PCB plug section, and the upper surface of the PCB plug section is exposed above the lower wall. The plug portion also includes side walls and an upper wall that form a plug shell over the upper surface of the PCB plug section such that the upper wall of the plug shell is positioned over and spaced from the upper surface of the PCB plug section by a predetermined gap distance that allows insertion of the USB device into a standard female connector socket. With this arrangement, the plug portion and the plug shell facilitate reliable and secure connection of the USB device to a standard female USB connection socket without requiring lead-based soldering of either the substrate or the plug shell to the PCB, thus facilitating the production of lead-free USB devices. In one embodiment, to facilitate repeated contact between the plug structure and a standard female USB connector socket, the housing is molded using a relatively hard plastic, such as PVC.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in USB connectors. The following description is presented to enable one of ordinary skill in the art to make and use the invention as provided in the context of a particular application and its requirements. As used herein, directional terms such as "upper", "upwards", "lower", "downward", "front", "rear", are intended to provide relative positions for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
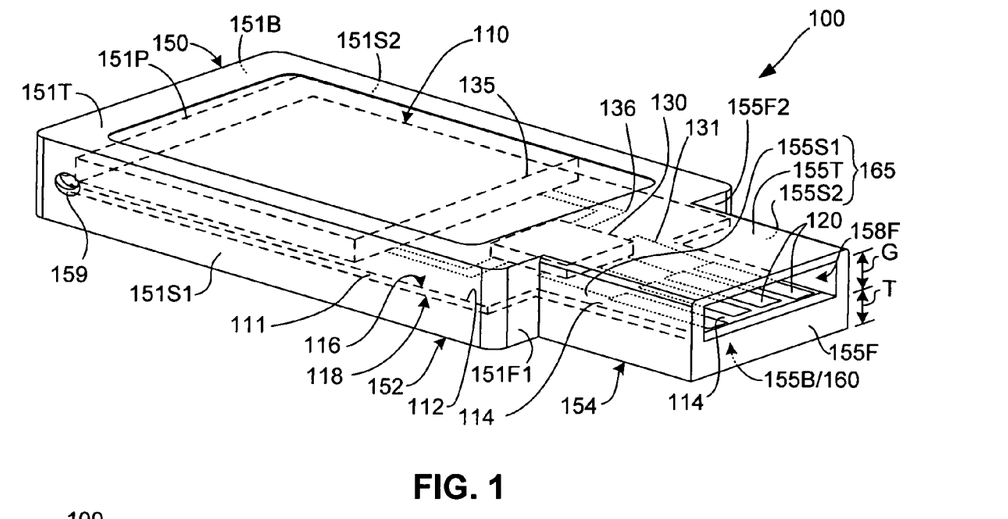
FIG. 1 is a top side perspective view showing an exemplary USB device according to an embodiment of the present invention.
Figure 2:
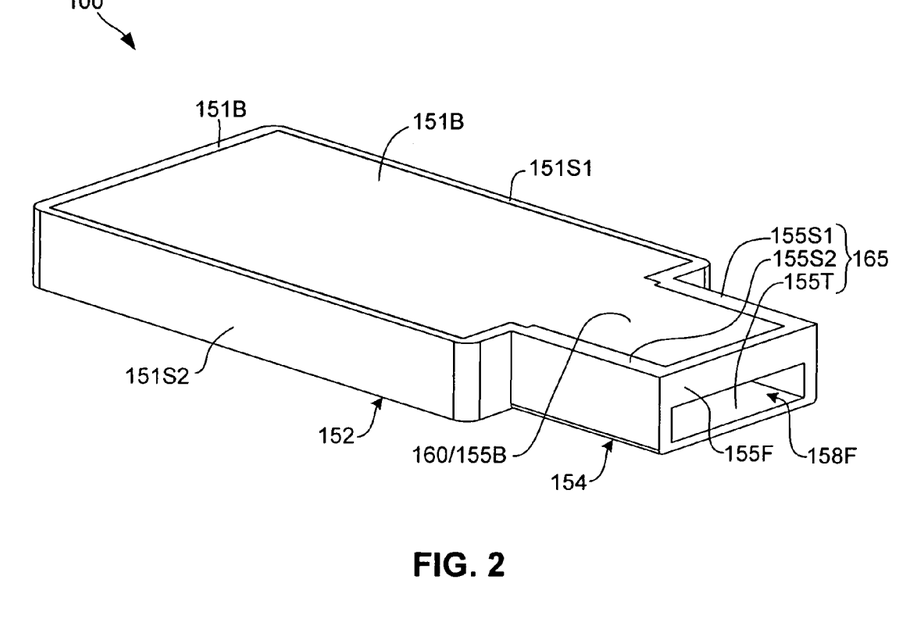
FIG. 2 is a bottom side perspective view showing the USB device of FIG. 1.

FIGS. 1 and 2 are top and bottom perspective views, respectively, showing a Universal-Serial-Bus (USB) device 100 according to a first embodiment of the present invention. USB device 100 generally includes a printed circuit board assembly (PCBA) 110 and a housing 150 that is fixedly mounted onto PCBA 110.

Figure 3:
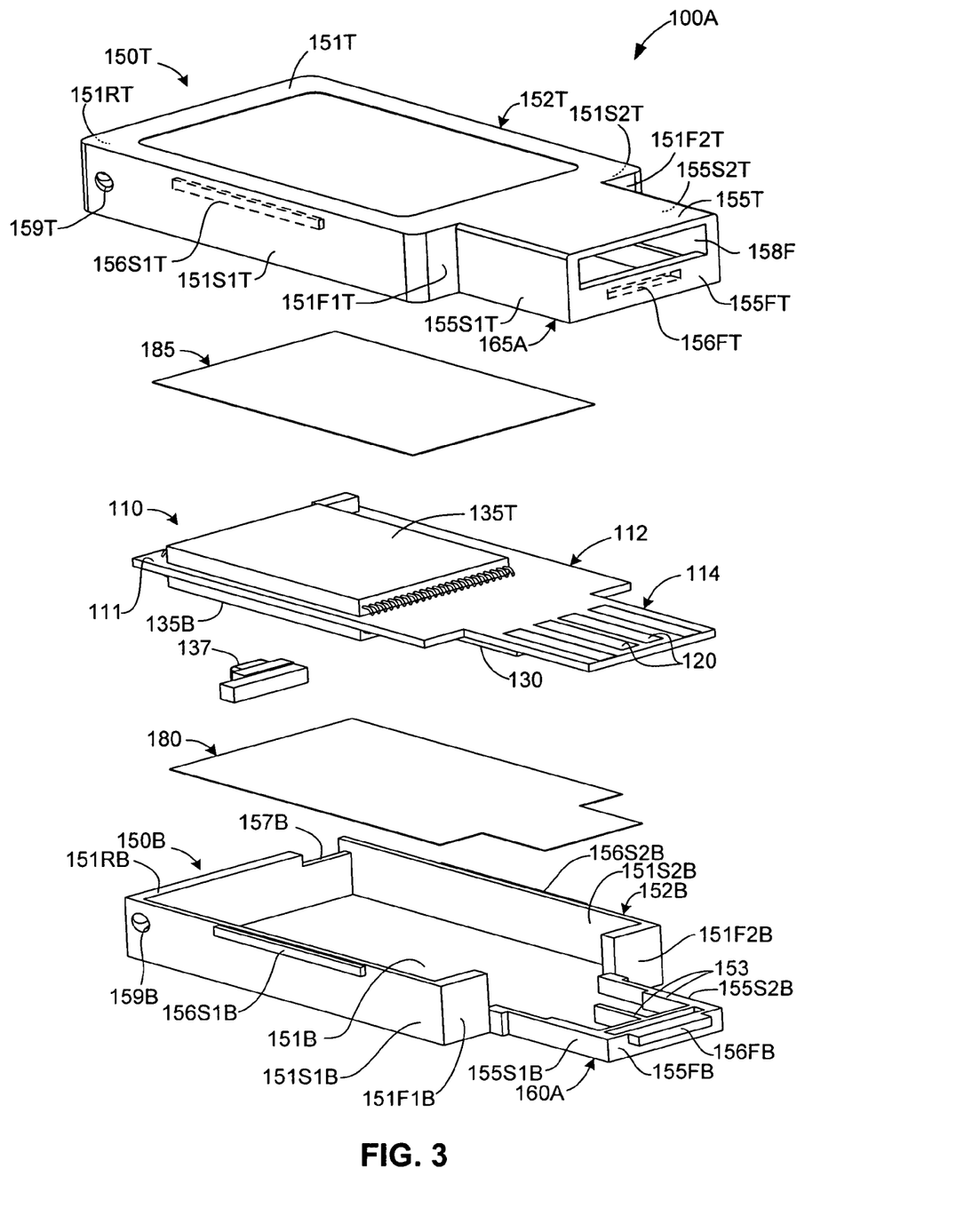
FIG. 3 is an exploded perspective view showing the USB device of FIG. 1.

Referring to the upper portion of FIG. 1 and to FIG. 3, PCBA 110 includes a printed circuit board (PCB) 111 including a relatively wide PCB handle section 112 and a relatively narrow PCB plug section 114 that extends from a front end of PCB handle section 112. PCB 111 is a substantially flat substrate, and has opposing sides that are referred to below as upper surface 116 and lower surface 118. Formed on upper surface 116 in plug section 114 are four metal contacts 120. Metal contacts 120 are shaped and arranged in a pattern established by the USB specification. At least one control integrated circuit (IC) 130 and zero or more auxiliary ICs 135 (e.g., a flash memory device or an RF communication circuit) are mounted on at least one of upper surface 116 and lower surface 118. ICs 130 and 135 are electrically connected to each other and to metal contacts 120 by way of metal traces 131 and 136, respectively (a few traces are depicted in FIG. 1 in a simplified manner by dashed lines for illustrative purposes). PCB 111 is formed in accordance with known PCB manufacturing techniques such that metal contacts 120 and ICs 130 and 135 (as well as zero or more other circuit components, which are omitted for brevity) are electrically interconnected by a predefined network including conductive traces 131 and 136 and other conducting structures that are sandwiched between multiple layers of an insulating material (e.g., FR4) and adhesive.

Referring to FIG. 1, housing 150 is a molded plastic structure generally includes a handle portion 152 mounted over PCB body section 112 such that ICs 130 and 135 are enclosed therein, and a plug portion 154 integrally connected to and extending from handle portion 152. Handle portion 152 is a box-like structure including parallel upper and lower cover walls 151T and 151B and a peripheral side wall, formed by parallel side walls 151S1 and 151S2 and a rear wall 155R, that extends between upper and lower cover walls 151T and 151B. Plug portion 154 includes a plug substrate structure 160, including a lower plug wall 155B, that extends under and abuts (supports) lower surface 118 of PCB plug section 114, and a plug shell structure 165 that is positioned over upper surface 116 of PCB plug section 114.

Figures 4A, 4B, 5A, 5B:
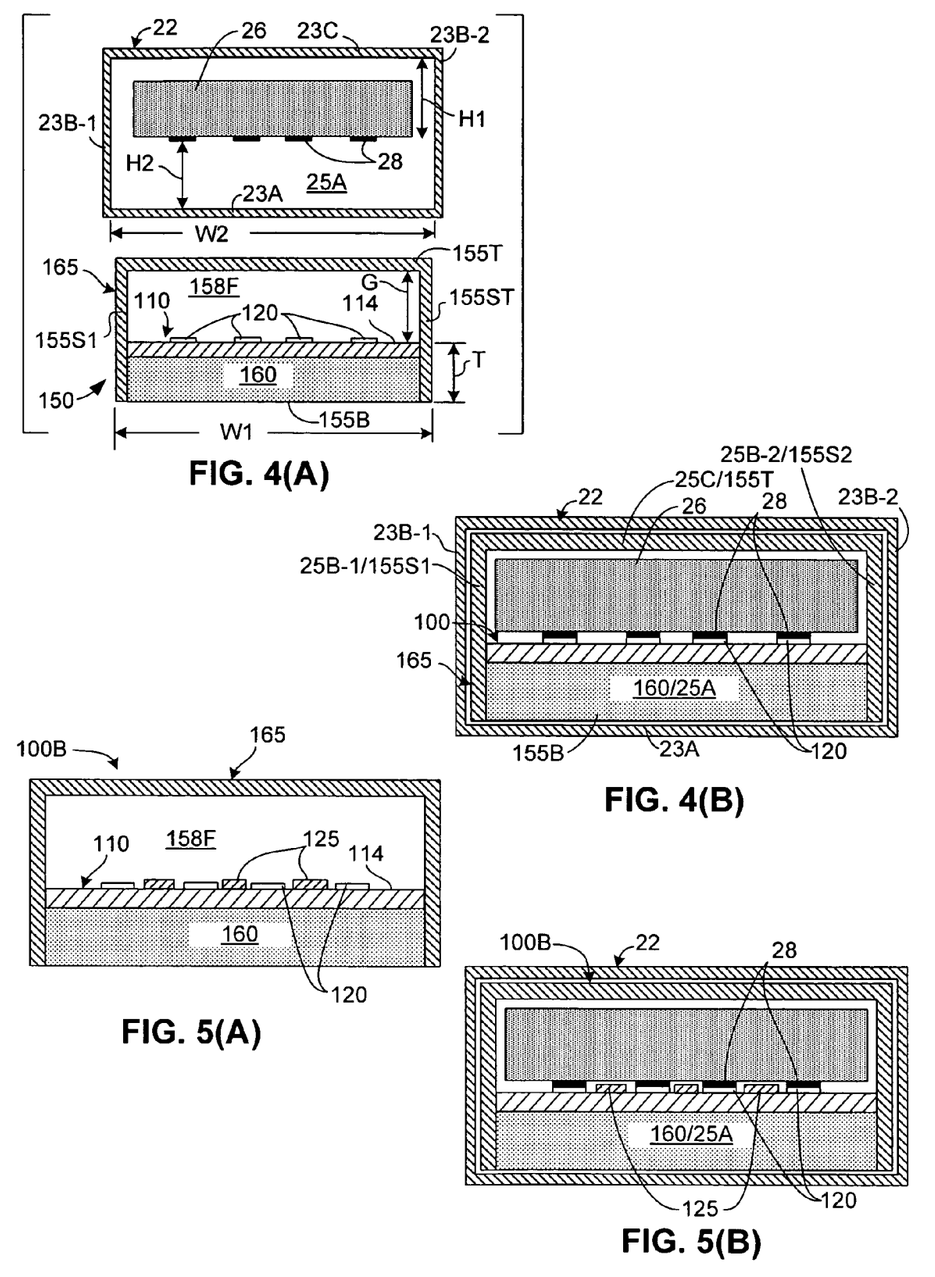
FIGS. 4(A) and 4(B) are cross-sectional side views showing a plug structure of the USB device of FIG. 1 and a standard female USB connector socket.
FIGS. 5(A) and 5(B) are cross-sectional side views showing a plug structure of an alternative USB device according to another embodiment of the present invention.

In accordance with an aspect of the present invention, as depicted in FIG. 1, plug substrate structure 160 and plug shell structure 165 collectively form a plug structure that is substantially identical to the plug shell of conventional male USB connectors without requiring soldering either structure to PCBA 110, as required in conventional male USB connectors, thereby facilitating the production of lead-free USB devices. Plug shell structure 165 includes first and second shell side walls 155S1 and 155S2 respectively connected to opposing side edges of and extending upward from plug substrate structure 160 along respective side edges of PCB plug section 114, and an upper shell wall 155T integrally connected to upper ends of shell side walls 155S1 and 155S2. Upper wall 151T is positioned over and spaced from upper surface 116 of PCB plug section 114 (i.e., from metal contacts 120) by a predetermined gap G., which is exposed through a front wall 155F of handle portion 152 by a front opening 158F. Note that front opening 158F exposes metal contacts 120 in gap G. Therefore, as depicted in FIG. 4(A), when PCBA 110 is mounted inside housing 150, plug substrate structure 160 is positioned under PCB plug section 114 and upper wall 155T of plug shell structure 165 is positioned over metal contacts 120 to collectively form the plug structure that is similar to the arrangement associated with conventional male USB connector plugs. In particular, as indicated in FIG. 4(A), gap distance G generally corresponds to a height H1 between metal contacts 28 and upper wall 23C of conventional standard female USB connector socket 22. Similarly, plug substrate structure 160 is formed such that the upper surface of PCB plug section 114 (i.e., metal contacts 120) are spaced a predetermined distance T from a lower surface of plug substrate structure 160 (i.e., the lower surface of bottom wall 155B), which distance T corresponds to a height H2 between metal contacts 28 and lower wall 23A of conventional standard female USB connector socket 22. Finally, shell side walls 155S1 and 155S2 of plug shell structure 165 are spaced apart by a width W1 that generally corresponds to the width W2 associated with side walls 23B-1 and 23B-2 of standard female USB connector socket 22. Accordingly, as indicated in FIG. 4(B), when inserted into standard female USB connector socket 22, PCB plug section 114, plug substrate structure 160 and plug shell structure 165 are securely received in standard female USB connector socket 22 such that, like conventional male USB connectors, when plug portion 154 is inserted inside standard female USB connector socket 22, metal contacts 120 slide against and are contacted by corresponding metal contacts 28 of the female connector. In particular, PCB plug section 114 and plug substrate structure 160 are sized to be received in lower socket region 25A of female USB connector socket 22 with shell side walls 155S1 and 155S2 respectively received in side socket regions 25B-1 and 25B-2, and shell upper wall 155T received in upper socket region 25C. Further, because shell side walls 155S1 and 155S2 and upper shell wall 155T are respectively integrally connected to corresponding side walls 151S1 and 151S2 and upper wall 151T of handle portion 152, respectively, and plug substrate structure 160 (e.g., bottom wall 155B, shown in FIG. 2) is integrally connected to bottom wall 155B of handle portion 152, the entire plug structure of USB device 100 is part of molded plastic housing 150 that mounts over PCBA 110, and thus does not require separate connection (e.g., by way of soldering) to PCBA 110.

According to another aspect, because, during expected normal use, plug substrate structure 160 and plug shell structure 165 are subjected to repeated contact with the metal cage of a standard female USB connector socket, housing 150 is preferably formed using a relatively hard plastic (e.g., PVC or PC). In some embodiments produced for applications in which limited contact between USB device 100 and a standard female USB connector socket is anticipated, housing 150 may be formed using a relative soft plastic (e.g., ABS).

FIG. 3 is an exploded perspective view showing a USB device 100A in accordance with a specific embodiment of the present embodiment in which housing 150 is mounted over PCBA 110 using a convenient snap-coupled arrangement. In particular, housing 150 generally includes a lower housing portion 150B and an upper housing portion 150T that snap-couple to each other over PCBA 110. Optional 180 and 185 are utilized to further secure lower housing portion 150B to upper housing portion 150T in the manner described below. Structures of USB device 100A that are identical to or similar to corresponding structures of generalized USB device 100 (shown in FIGS. 1 and 2) are identified with the same or similar reference numbers.

Referring to the bottom of FIG. 3, lower housing portion 150B generally includes a lower handle portion 152B and a plug substrate structure 160A. Lower handle portion 152B includes a lower wall 151B and an inner peripheral wall formed by lower side walls 151S1B and 151S2B and lower rear wall 151RB extending upward from (perpendicular to) peripheral edges of lower wall 151B. Plug substrate structure 160A extends from a front wall portions 151F1B and 151F2B of lower handle portion 152B, which defines a gap as shown in FIG. 3 to facilitate mounting of PCBA 110. Plug substrate structure 160A includes several support ribs 153 that extend upward from a lower plug wall 155B and, when mounted below PCBA 110, contact and help support plug section 114 of PCB 111. Support ribs 153 are surrounded on three sides by lower plug side walls 155S1B and 155S2B and lower plug front wall 155FB.

Upper housing portion 150T generally includes an upper handle portion 152T and a plug shell structure 165A. Upper handle portion 152T includes upper wall 151T and an outer peripheral wall formed by upper side walls 151l1T and 151S2T and upper rear wall 151RT, which extend downward from (perpendicular to) peripheral edges of upper wall 151T. Plug shell structure 165A extends from upper front wall sections 151F1T and 151F2T, and includes a peripheral wall formed by upper plug side walls 155S1T and 155S2T and upper plug front wall 155FT, which defines front opening 158F. Upper wall 155T is integrally connected to the peripheral wall.

In accordance with an aspect of the present embodiment invention, lower housing portion 150B and upper housing portion 150T are fabricated such that the housing portions can be snap-coupled over PCBA 110 during the housing assembly process. In particular, the respective peripheral walls of housing portions 150B and 150T are constructed such that the inner peripheral wall of lower housing portion 150B can be inserted inside the outer peripheral wall of upper housing portion 150T, whereby the outside surfaces of the inner peripheral wall abut the inside surfaces of the outer peripheral wall. In addition, either a slot or a tab are provided on the outside surface of the inner peripheral walls, and a corresponding tab or slot are provided on the inside surfaces of the outer peripheral walls, wherein each tab is snap-coupled into a corresponding slot when upper housing portion 150T is mounted onto the lower housing portion 150B. In the present embodiment, the outside surfaces of selected lower walls (e.g., lower side wall 151S1B and lower plug front wall 151FB) includes a corresponding tab (e.g., tabs 156S1B and 156FB), and the inside surfaces of the outer peripheral walls (e.g., upper side wall 151S1T and upper plug front wall 155FT) of upper housing portion 150T defines a corresponding slot (e.g. 156S1T and 156FT) such that each tab is snap-coupled into a corresponding slot when upper housing portion 150T is mounted onto lower housing portion 150B. Note that the number of slots/tabs provided on each peripheral wall may be substantially arbitrarily selected, as well as the peripheral wall (inner or outer) on which the tabs/slots are provided. Note also that the various slots may either pass entirely through the corresponding wall, or as depicted by the dashed lines in the figures, be covered by an outer layer of the corresponding wall.

According to another aspect of the present invention, adhesive layers 180 and 185 are respectively provided between a lower PCBA surface (e.g., the surface of IC 135B facing downward from PCB 111) and lower cover wall 151B, and between an upper PCBA surface (e.g., the surface of IC 135T facing upward from PCB 111) and upper cover wall 151T in order to substantially permanently secure the housing formed by lower housing portion 150B and upper housing portion 150T over PCBA 110. Although the snap-coupling arrangement described above may be sufficient to prevent separation of housing portions 150B and 150T under normal operating conditions, the two housing portions may be separated during assembly. To prevent such disassembly, adhesive layers 180 and 185 serve to secure housing portions 150B and 150T together by way of PCBA 110. As mentioned above, PCBA 110 is formed using conventional PCB assembly procedures, and as such ICs 135B and 135T are rigidly secured to PCB 111. When secured to lower housing portion 150B by way of adhesive layer 180 and upper housing portion 150T by way of adhesive layer 185, PCBA 110 helps resist separation of the housing portions in response to an applied shearing force by resisting relative movement of the housing portions. In accordance with an embodiment of the present invention, adhesive layers 180 and 185 are pressure or heat activated, and mounted onto the inner surfaces of housing portions 150B and 150T before the assembly process is performed. In this manner, the snap-coupling procedure may be completed and reversed, if necessary, before permanent connection of housing portions 150B and 150T to PCBA 110 (e.g., in response to an applied pressure or heat). Alternatively, a standard adhesive may be used, but this may result in inadvertently gluing the housing portions together in a non-optimal position. In yet another embodiment, a liquid adhesive may be injected into the housing after the snap-coupling process to secure the PCBA to the cover plates.

Referring to the upper portion of FIG. 3, PCBA 110 also includes an optional light-pipe (light-generating device) 137 mounted onto either upper surface 116 or lower surface 118 of PCB 111 adjacent to a back edge of PCB 111. Light-pipe 137 is controlled by a signal generated, for example by control IC 130 and transmitted over an associated conductive trace formed on PCB 111 according to known techniques. To facilitate viewing of light-pipe 137, the rear walls (e.g., rear bottom wall 151RB) are provided with suitable access openings (e.g., opening 157B) that, when PCBA 110 is properly mounted inside housing 150, is aligned with light-pipe 137 such that light-pipe 137 is visible.

In accordance with another optional aspect of the present invention, USB device 100 may be provided with a through hole that passes through housing 150 to facilitate, for example, the engagement of a key-chain structure. In particular, referring to FIG. 3, lower housing portion 150B includes a lower opening 159B and upper housing portion 150T includes an upper opening 159T that align to form a coincident opening 159 (FIG. 1) when the upper and lower housing portions are snap-coupled together as described above.

FIGS. 5(A) and 5(B) are simplified front views showing the plug portion of a USB device 100B according to a variation of the embodiment described above. Structures of USB device 100B that are identical to those of USB device 100 are identified with the same reference numerals, and will not be described in detail for sake of brevity. In accordance with another aspect, PCBA 110 includes elongated metal dividers 125 formed on the upper surface of plug section 114, with each metal divider 125 being located between an adjacent pair of the metal contacts 120. Metal dividers 125 increase the rigidity of the plug structure, thus further enhancing the secure engagement between the plug structure and standard female USB socket connector 22.

In accordance with another aspect of the present invention, handle section 152 includes an indented panel section 151P formed in upper wall 151T, and a similar panel section formed in lower wall 151B, to facilitate manual manipulation of USB device 100.

Figure 6:
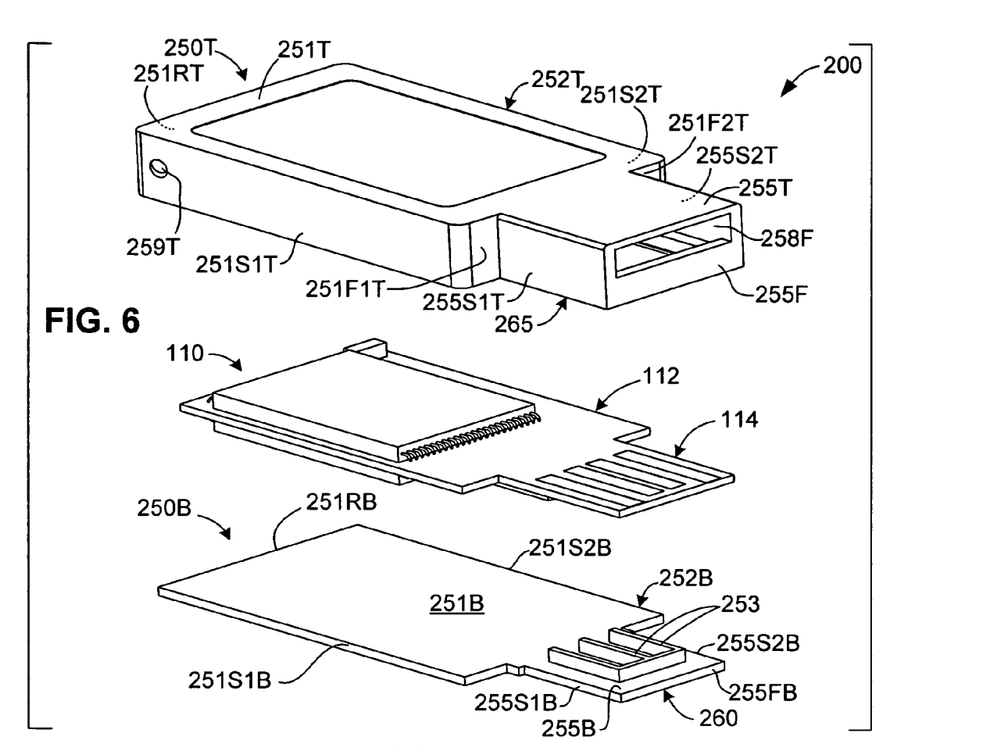
FIG. 6 is an exploded perspective view showing an exemplary USB device according to another embodiment of the present invention.

FIG. 6 is an exploded perspective view showing an USB device 200 according to another specific embodiment of the present invention. USB device 200 includes a lower housing portion 250B, upper housing portion 250T, and PCBA 110. Lower housing portion 250B includes a lower handle section 252B including a relatively wide lower cover plate 251B, and a relatively narrow plug substrate structure 260 that includes a lower plug wall 255B and several support ribs 253 extending upward from lower plug wall 255B. Lower cover plate 251B has a peripheral edge that includes side edges 251S1B and 251S2B, and rear edge 251RB. Upper housing portion 250T generally includes an upper handle section 252T and a plug shell structure 260. Upper handle section 252T includes parallel side walls 251S1T and 251S2T, a rear wall 255RT, and front wall sections 251F1T and 251F2T, all supporting an upper wall 251T. Plug shell structure 265 includes first and second shell side walls 255S1T and 255S2T, an upper shell wall 255T integrally connected to upper ends of shell side walls 255S1T and 255S2T, and a front wall 255F that defines a front opening 258F.

Figure 7:
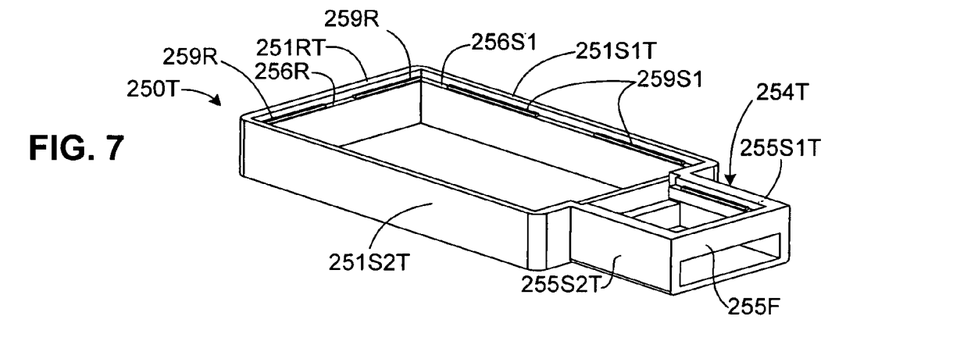
FIG. 7 is a bottom side perspective view showing an upper housing portion of the USB device of FIG. 6.
Figure 8:
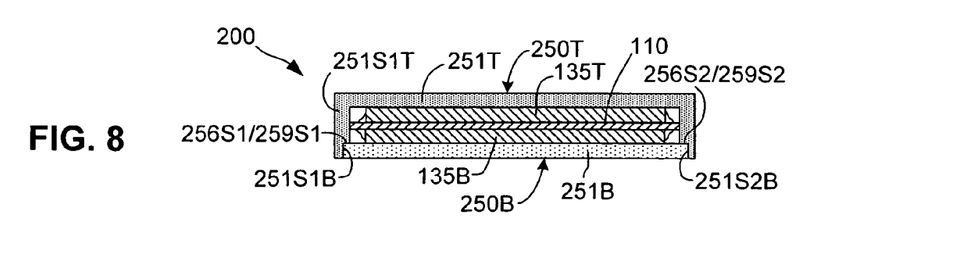
FIG. 8 is a cross-sectional end view showing the USB device of FIG. 6 in an assembled state.

In accordance with an aspect of the present embodiment invention, as indicated in FIG. 7, a peripheral shelf is formed in around the peripheral wall of upper housing portion 250T (e.g., shelf portion 256S1 shown on handle side wall 251S1T, and shelf portion 256R shown on handle rear wall 251RT), and several welding structures are formed on the peripheral shelf (e.g., welding structures 259S1 shown on shelf portion 256S1, and welding structures 259R shown on handle rear wall 251RT). As indicated in FIG. 8, when upper housing portion 250T is mounted over PCBA 110 and onto lower housing portion 250B, the peripheral edge (e.g., edges 251S1B and 251S2B) of lower cover plate 251B become engaged in the peripheral shelf formed in the peripheral walls of upper housing portion 250T (e.g., e.g., shelf portions 256S1 and 256S2). Subsequently, ultrasonic energy is applied through the peripheral edge of lower cover plate 251B using known techniques, thereby melting the welding structures (e.g., welding structures 259S1 and 259S2), thus welding upper housing portion 250T to lower housing portion 250B and completing the fabrication of USB device 200.

Figure 9:
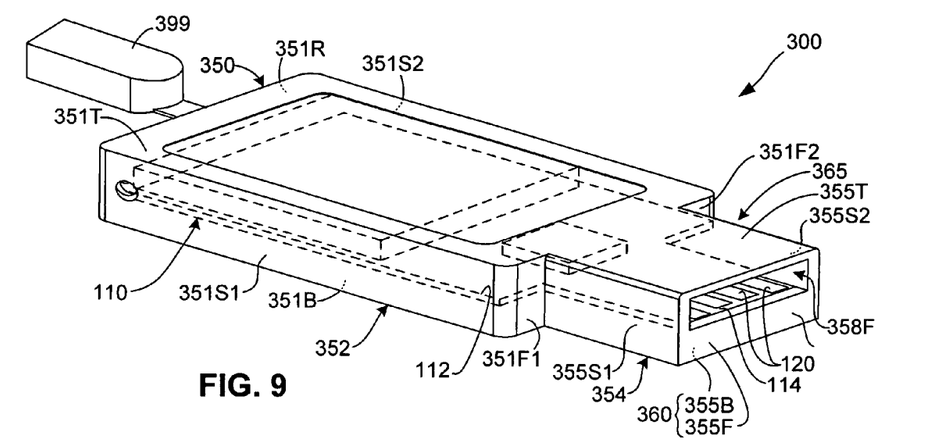
FIG. 9 is a perspective view showing an exemplary USB device according to another embodiment of the present invention.
Figure 10:
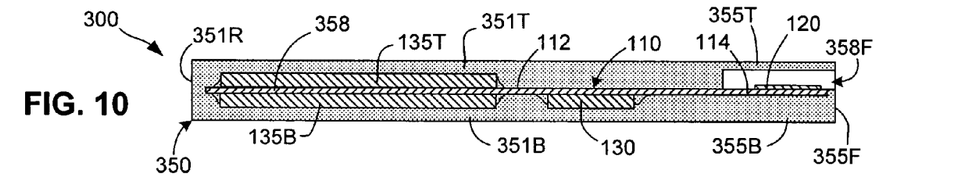
FIG. 10 is a cross-sectional side view showing he USB device of FIG. 9.

FIGS. 9 and 10 are perspective and cross-sectional side views showing a USB device 300 according to another embodiment of the present invention. USB device 300 generally includes a plastic housing 350 that is molded over PCBA 110 (described above) in a single-step molding process. Housing 350 includes a handle portion 352 and a plug portion 354 that form an integrally molded structure. Handle portion 352 includes a lower cover plate 351B, and upper cover plate 351T, and a peripheral wall formed by side walls 351S1 and 351S2, rear wall 351R, and front wall sections 351F1 and 351F2. Plug portion 354 includes a plug substrate structure 360 formed by lower plug wall 355B and front wall (surface) 355F, and a plug shell structure 365 formed by side walls 355S1 and 355S2 and upper wall 355T. As with previous embodiments, plug shell structure 365 defines a front opening 358F that facilitates access to PCB plug section 114 and metal contacts 120. As indicated in FIG. 10, the molded material forming housing 350 is integrally molded onto both ICs 130 and 135B on the bottom surface of PCBA 110, and onto IC 135T on the top surface of PCBA 110 (i.e., such that the molded material is injected into and between the various cracks and crevices defined between the ICs and PCB handle portion 112). In other words, the single step molding process produces a single (integral) molded structure in which upper wall 351T is integrally connected to lower wall 351B by way of the peripheral wall structure formed, for example, by rear wall 351R and side walls 351S1 and 351S2.

Figure 11A:
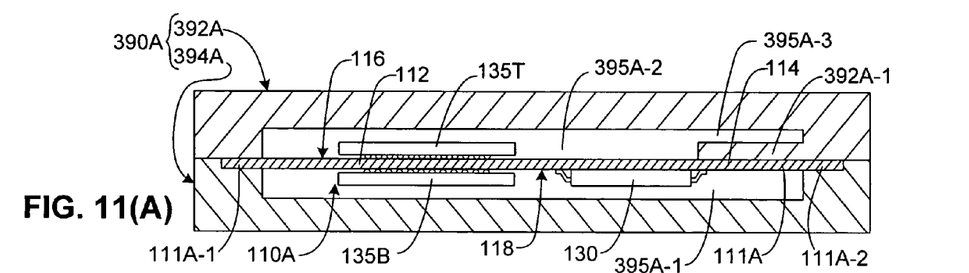
FIGS. 11(A) and 11(B) are cross-sectional side views showing simplified plastic molding apparatus for producing the USB device shown in FIG. 9 according to alternative embodiments of the present invention.
Figure 11B:
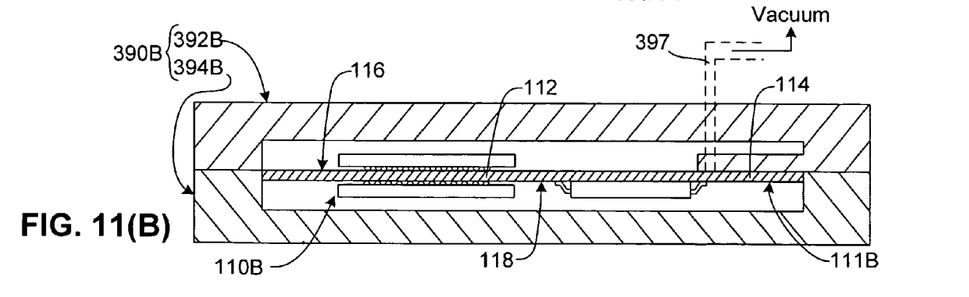

FIGS. 11(A) and 11(B) are cross-sectional side views showing simplified plastic molding apparatus 390A and 390B for producing USB device 300 according to alternative embodiments of the present invention.

Referring to FIG. 11(A), plastic molding apparatus 390A includes an upper die structure 392A and a lower die structure 394A that define a cavity therebetween for forming molded housing 350 on a PCBA 110A. The cavity defined by plastic molding apparatus 390A includes a first cavity region 395A-1 located below handle section 112 and plug section 114 of PCB 11A, a second cavity region 395A-1 located above handle portion 112, and a third region 395-3 located above a protruding portion 392A-1 of upper die structure 392A for forming plug shell structure 365 (FIG. 9). Note that a PCB 111A of PCBA 110A includes end structures 111A-1 and 111A-2 that are pinched between corresponding sections of upper die structure 392A and lower die structure 394A, thereby maintaining PCBA 110A in a correct position during the molding process. With PCBA 110A secured as shown, molten plastic is injected into the various cavity regions of plastic molding apparatus 390A using known techniques, thereby forming housing 350 (FIG. 9). After the molding process is completed, the overmolded structure is removed from plastic molding apparatus 390A, and end structures 111A-1 and 111A-2 are removed (trimmed).

FIG. 11(B) shows an alternative plastic molding apparatus 390B that avoids the final trimming process required by apparatus 390A. Plastic molding apparatus 390B includes an upper die structure 392B and a lower die structure 394B similar to die structures 392A and 394A (described above) for forming molded plastic housing 350 on a PCBA 110B. However, instead of pinching edge portions of PCB 111B, PCBA 110B is held in place by one or more vacuum lines 397, thus avoiding the need for end structures and the final trimming process.

Figure 12:
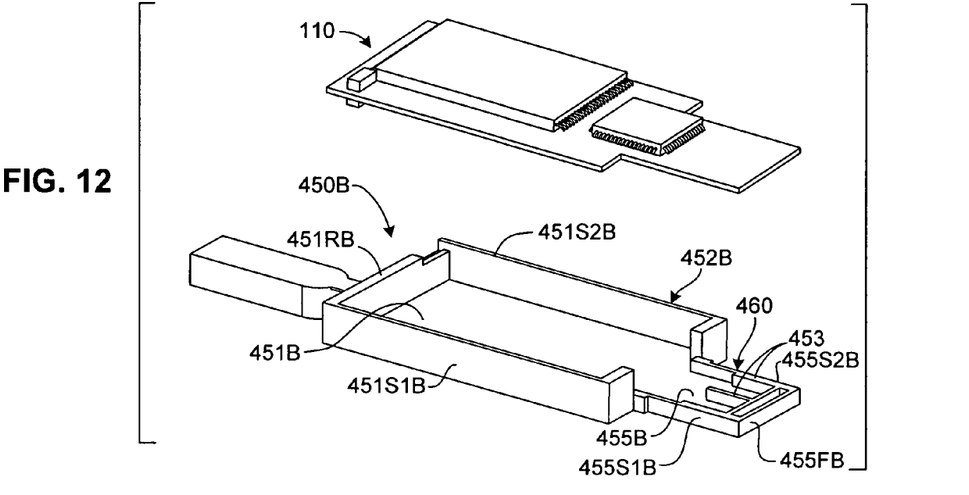
FIG. 12 is an exploded perspective view showing a portion of a USB device according to another embodiment of the present invention.

FIG. 12 is an exploded perspective view showing portions of a USB device that are assembled using a two-step molding process according to another specific embodiment of the present invention. First, a pre-molded plastic housing portion 450B is formed according to known plastic molding techniques for receiving PCBA 110 (described above). Housing portion 450B includes a peripheral wall (e.g., side walls 451S1B and 451S2B and rear wall 451RB) extending upward from a lower cover plate 451B. Housing portion 450B also includes a plug substrate structure 460 including a lower plug wall 455B, side walls 455S1B and 455S2B, and a front wall 455FB, and several support ribs 453 extend upward from lower wall 451B.

Figure 13:
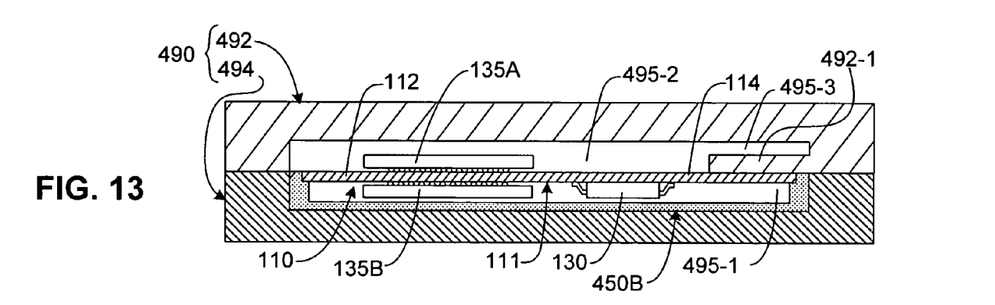
FIG. 13 is a cross-sectional side view showing a simplified plastic molding apparatus for completing the production of the USB device shown in FIG. 12 according to another embodiment of the present invention.
Figure 14:
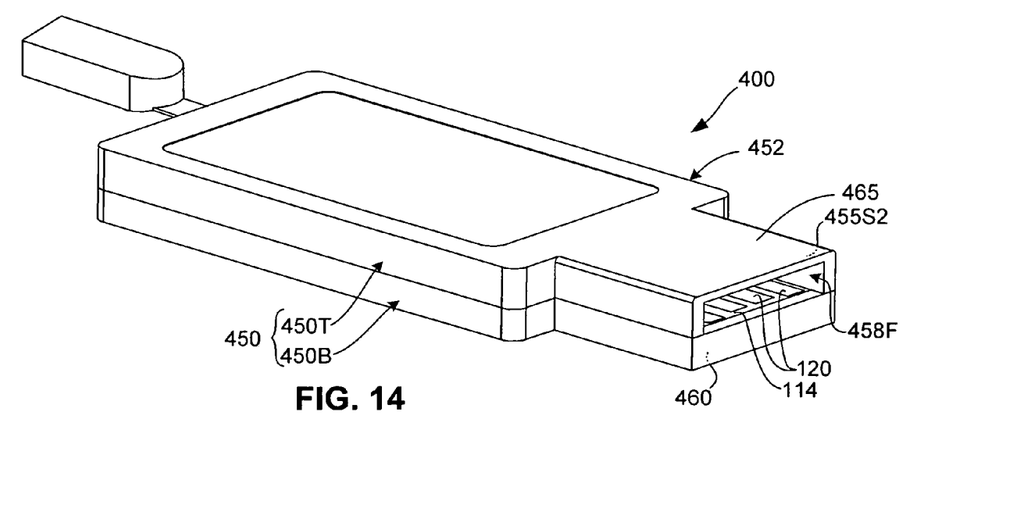
FIG. 14 is a perspective view showing the completed USB device produced by the plastic molding apparatus of FIG. 13.

FIG. 13 is a cross-sectional side view showing a simplified plastic molding apparatus 490 for performing the second phase of the two-step molding process. Plastic molding apparatus 490 includes a lower die structure 494 defining a lower cavity region 495-1, and an upper die structure 492 defining upper cavity regions 495-2 and 495-3, which are similar to the cavity regions discussed above with reference to FIG. 11(A). As indicated in FIG. 13, an assembly including lower housing portion 450B and PCBA 110 is mounted into a lower cavity region 495-1 such that pre-molded plastic housing portion 450B abuts the inside surface of lower die structure 494, and PCBA 110 is mounted on housing portion 450B such that a peripheral edge of PCB 111 is supported on a peripheral edge of housing portion 450B. Upper die structure 492 is then mounted over lower die structure 494 such that upper cavity region 495-2 is formed over PCB handle portion 112, and cavity region 495-3 is spaced from the upper surface of PCB plug section 114 by die portion 492-1. Molten plastic material is then injected into upper cavity regions 495-2 and 495-3 using known techniques, thereby forming an upper housing portion 450T (shown in FIG. 14) that is integrally molded onto IC 135A and the upper surface of PCBA 110, and such that upper housing portion 450T is integrally molded onto exposed peripheral edge surfaces of lower housing portion 450B. FIG. 14 shows a completed USB device 400 including a completed molded plastic housing 450 including upper housing portion 450T integrally molded onto lower housing portion 450B, and forming a handle portion 452 that is integrally molded to a plug substrate structure 460 and a plug shell structure 465 that defines an opening 458F through which PCB plug section 114 and metal contacts 120 are accessed in the manner described above.

The various USB device structures described herein may be modified using appropriate ICs (e.g., ICs 130 and 135) to serve as convenient external storage for, for example, MP3 players (i.e., media storage for music), digital cameras, and mobile phones.

Figure 15:
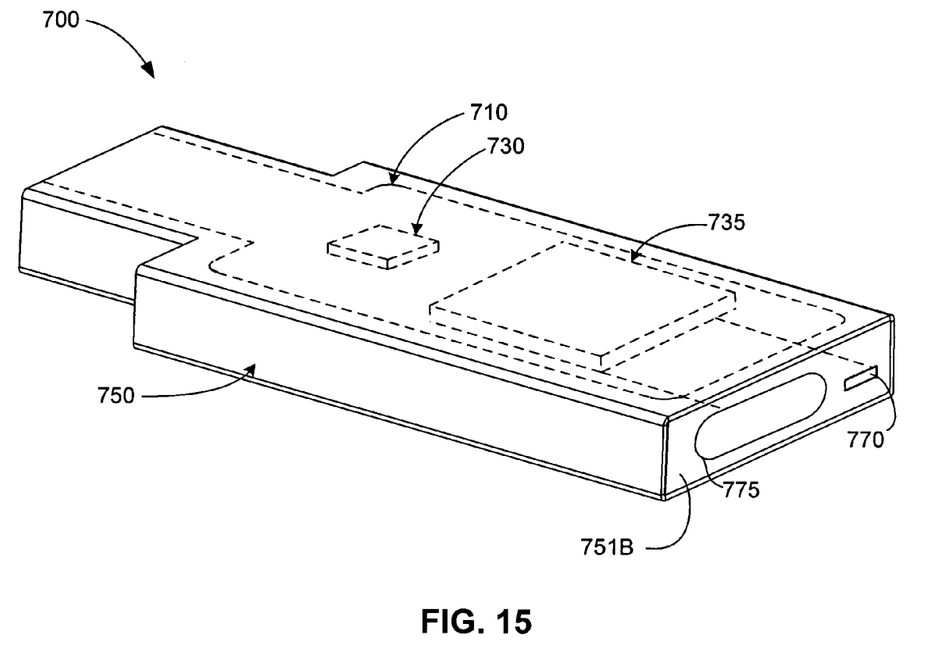
FIG. 15 is a perspective view showing a wireless communication-type USB device produced in accordance with another embodiment of the present invention.

In yet another embodiment, the disclosed USB device structures may be utilized to facilitate wireless communications. In this case, a USB device (e.g., Bluetooth USB adapter 700 shown in FIG. 15) may be plugged into the USB port of a host device, and may include a wireless communication device 735 that generates wireless signals emitted from a transceiver antenna 775, which may be provided on a back side of housing 750 to maximize the effect of signal transmission. Wireless communication device 735 communicates with a host (e.g., a computer) via USB control IC 730, and includes a Bluetooth controller, a radio frequency (RF) transceiver, a baseband controller, memory (e.g., EEPROM), a voltage regulator, a crystal, and a control circuit for controlling LED 770. These circuits may be combined together, along with passive circuits (e.g., resistors, capacitors and inductors) in a single chip, as depicted, or formed on one or more separate chips that are mounted on PCB 710 and enclosed by housing 750 and associated case 760 that are connected together in the manner described above. Such an arrangement would facilitate communication between the host and a wireless communication device, such as a BlueTooth-enabled device. Bluetooth is a wireless technology that enables any electrical device to wirelessly communicate in the 2.4 GHz frequency band. It allows devices such as mobile phones, headsets, PDA's and computers to communicate and send data to each other without the need for wires or cables to link to devices together. It has been specifically designed as a low cost, low power, radio technology, which is particularly suited to the short range Personal Area Network (PAN) application. By plugging Bluetooth USB adapter 700 into the USB port, the Bluetooth USB adapter enables a non-Bluetooth electrical device (i.e., the host) to communicate with Bluetooth enabled devices. One specific wireless application may be a BlueTooth mouse device, which are used today for cursor pointing. Another application example is allowing computer user doing two-way communication to Bluetooth-wireless equipped mobile phones, PDA, keyboard, printer, digital camera, and MP3 player. Other applications may include wireless headsets. Yet another application may include enabling BlueTooth wireless connections inside an automobile to facilitate "hands free" operation of a mobile phone. Of course, other wireless communication protocols, such as IrDA infrared transmitting devices, may also be utilized in conjunction with USB devices of the present invention.

In addition to the specific housing arrangements described above with reference to the various disclosed embodiments, those skilled the art will recognize that other housing structures and connection methods may be used. For example, instead of a tab/slot snap-together arrangement, the upper and lower housing portions may be connected by way of ultrasonic welding. Accordingly, unless otherwise specified, the appended claims are not intended to be limited to the disclosed housing arrangements.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A Universal-Serial-Bus (USB) device comprising:
    a printed circuit board assembly (PCBA) including:
        a printed circuit board (PCB) having opposing upper and lower surfaces and including a PCB body section and a PCB plug section,
        a plurality of metal contacts disposed on the upper surface of the PCB plug section, and
        at least one integrated circuit (IC) mounted on the PCB body section, the IC including means for processing USB signals transmitted to the plurality of metal contacts; and
    a plastic housing including a handle portion mounted over the PCB body section such that the IC is enclosed inside the handle portion, and a plug portion integrally connected to and extending from the cover portion, wherein the plug portion includes:
        a plug substrate structure extending under and abutting the lower surface of the PCB plug section,
        a plug shell structure including first and second shell side walls extending upward from the plug substrate structure along respective side edges of the PCB plug section, and an upper shell wall integrally connected to upper ends of the first and second shell side walls and to the handle portion, and positioned over and spaced from the upper surface of the PCB plug section by a predetermined gap.

2. The USB device of claim 1, wherein the PCBA comprises a lead-free structure.

3. The USB device of claim 1, wherein the housing comprises:
    a lower housing portion including a lower cover portion having a lower cover wall and a first peripheral wall extending perpendicular to the cover plate;
    a plurality of tabs formed on an outside surface of the first peripheral wall;
    an upper housing portion including a top cover wall and a second peripheral wall extending perpendicular to the top plate, wherein an inside surface of the second peripheral wall defines a plurality of slots arranged such that, when the upper housing portion is mounted over the lower housing portion, each of the tabs formed on the first peripheral wall engages a corresponding slot formed on the second peripheral wall.

4. The USB device of claim 3, further comprising a first adhesive layer disposed between a lower surface of the PCBA and the lower cover wall, and a second adhesive layer disposed between the upper surface of the PCBA and the upper cover wall.

5. The USB device of claim 4, wherein the first and second adhesive layers comprise heat-activated adhesive films.

6. The USB device of claim 1, wherein the plug substrate structure comprises:
   a plug lower wall; and
   a plurality of plug support ribs mounted on an upper surface of the plug lower wall,
   wherein the PCBA is mounted on the plug substrate structure such that the PCB plug section abuts an upper surface of the plug support ribs.

7. The USB device of claim 6,
   wherein the first and second shell side walls extend over respective side edges of the lower wall, and
   wherein the shell front wall extends over a front edge of the lower wall.

8. The USB device of claim 7,
   wherein the shell front wall defines a front slot, and
   wherein the plug substrate structure further comprises a tab integrally connected to the front edge of the lower wall and engaged in the front slot.

9. The USB device of claim 1, further comprising a light-producing device mounted on the PCB body section, wherein a peripheral wall of the housing defines an opening aligned such that the light-producing device is visible through the opening.

10. The USB device of claim 1, wherein at least one wall of the handle portion of the housing defines a key-chain hole for receiving a key chain therein.

11. The USB device of claim 1, wherein the PCB further comprises metal dividers formed on the upper surface of the PCB, each of the metal dividers being located between an adjacent pair of the metal contacts.

12. The USB device of claim 1, wherein the housing comprises:
   a lower housing portion including a lower cover plate having a peripheral edge; and
      an upper housing portion including a peripheral wall and a top cover plate integrally connected to upper edges of the peripheral wall, and
   wherein the upper housing portion is mounted onto the lower housing portion such that the peripheral edge of the lower cover plate is ultrasonically welded onto the peripheral wall of the upper housing portion.

13. The USB device of claim 1, wherein the housing comprises a molded material integrally molded onto at least one said IC and at least one of the upper and lower surfaces of the PCB.

14. The USB device of claim 13, wherein said molded material includes a lower wall integrally molded onto a first IC and the lower surface of the PCB, and an upper wall integrally molded onto a second IC and the upper surface of the PCB, wherein the upper and lower walls are integrally molded together by way of a peripheral wall.

15. The USB device of claim 13,
   wherein said housing comprises a lower housing portion attached to the lower surface of the PCB over a first IC, and
   wherein the molded material comprises an upper molded structure integrally molded onto a second IC and the upper surface of the PCB, wherein the upper molded structure is also integrally molded onto a peripheral edge of the lower housing portion.

16. The low-profile USB device of claim 1, wherein the ICs include a wireless communication transmission device.

\* \* \* \* \*